Jan. 29, 1957 O. J. SCHORER 2,779,436
OILER FOR PERCUSSIVE TOOLS
Filed May 3, 1954 2 Sheets-Sheet 1

OTTO J. SCHORER
INVENTOR.

OTTO J. SCHORER
INVENTOR.

BY
atty

United States Patent Office 2,779,436
Patented Jan. 29, 1957

2,779,436
OILER FOR PERCUSSIVE TOOLS

Otto J. Schorer, Northampton, Mass., assignor to Worthington Corporation, Harrison, N. J., a corporation of Delaware Application May 3, 1954, Serial No. 427,262

3 Claims. (Cl. 184—55)

This invention relates generally to percussive tools and more particularly to an oiler in the pressure air supply line for the tool adapted to meter lubricant into the pressure air for lubricating the working parts of the tool.

It has been found that in oilers for percussive tools provided with metering devices to positively control the quantity of lubricant fed with the pressure air to the percussive tools, that tilting or displacing the oiler tends to affect the functioning of the inlet and outlets for pressure air and lubricant respectively to the extent that they fail to deliver the needed quantity of lubricant for lubricating the tools, thereby causing excessive wear and eventually breakdown of the tool being so fed.

The present invention covers an oiler which has no moving parts, is simple in construction, and includes passages communicating with the pressure air and the lubricant reservoir so disposed that at least one of the passages therein will be submerged in the lubricant in the reservoir regardless of the position of the oiler.

It is another object of the present invention to provide an oiler which will deliver substantially a uniform consumption of lubricant.

It is another object of the present invention to prevent flooding of the oiler when the pressure air passing therethrough is shut off.

With these and other objects in view, as may appear from the accompanying specification, the invention consists of various features of construction and combination of parts, which will be first described in connection with the accompanying drawings, showing an oiler for percussive tools of a preferred form embodying the invention, and the features forming the invention will be specifically pointed out in the claims.

Figure 1:
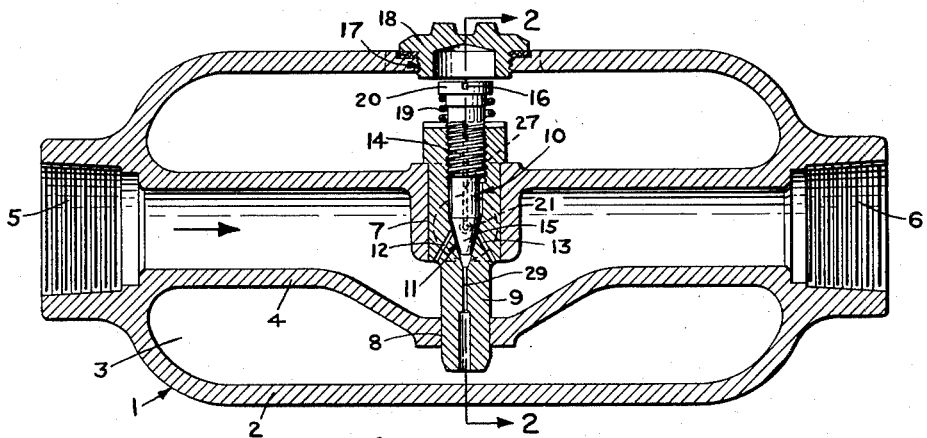
Figure 1 is a vertical section through one form of the invention.

Referring to the drawings, Figure 1 shows a line oiler generally designated 1 comprising a hollow casing or shell 2 which forms a lubricant reservoir 3 having a pressure air conduit 4 extending diametrically therethrough substantially parallel to the longitudinal axis of the lubricant reservoir. The pressure conduit 4 has threaded coupling means 5 and 6 at opposite ends continuous therewith for connecting the line oiler 1 into the pressure air line (not shown) for delivering air under pressure to a percussive tool of any suitable type.

Transversely of the longitudinal line of the conduit 4 are bores 7 and 8 and fitted in airtight engagement with said bores is a valve housing 9.

Valve housing 9 has a main bore or valve chamber 10 in the axial line thereof having a conical valve seat 11 at the lower end. The valve seat 11 is adapted to communicate through upstream passage 12 and downstream passage 13 with the conduit 4, the terms upstream and downstream being functions of the direction of flow through the conduit 4, as indicated by the arrow in Figure 1. It will be understood that the flow could be reversed and that the operation would be the same in this form of the oiler.

The passages 12 and 13 are disposed at opposite angles and transversely of the longitudinal line of the conduit 4, their lower ends opening into the conduit 4 and their upper ends opening on the valve seat 11.

Adjacent its upper end, the main bore or valve chamber 10 is adapted to threadably mount a valve 14 having a conical head 15 which may be moved into and out of engagement with the valve seat 11 to adjust the flow area therebetween when threaded inwardly or outwardly of the main bore 10 by means of a suitable instrument (not shown) which can engage the transfer slot 16, through the opening 17 when the plug 18 is removed from this opening.

The plug 18 serves a dual purpose in that it may be backed off when the pressure air is stopped to reduce the pressure remaining or equalized in the lubricant reservoir.

Figure 2:
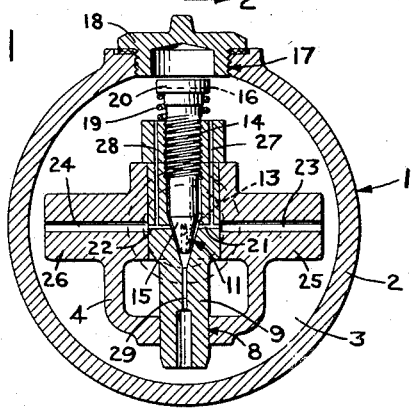
Figure 2 is a section taken on line 2—2 of Fig. 1.

A spring 19 is also provided about the valve 14, which engages the head 20 thereof at one end and the upper end of the valve housing 9 at the other end to hold the conical head 15 in its adjusted position relative to the valve seat 11, all of the above being clearly shown in Figures 1 and 2 of the drawings.

Figure 2, further shows transverse passages 21 and 22 which open on the valve seat 11 in the same plane as the ends of the passages 12 and 13, but are disposed transversely of said passages, the outer ends of the passages 21 and 22 communicating with lateral outlet passages 23 and 24 in the arms 25 and 26, the outer ends of the lateral outlet passages 23 and 24 in turn opening into the lubricant reservoir at their respective outer ends.

The arms 25 and 26 are disposed transversely of the vertical plane of said passages 12 and 13 and are shown cast integrally as part of the conduit 4, however, it is understood that they may be separate units threadably connected thereto or other means without departing from the spirit of the present invention.

Upper outlet passages 27 and 28 in the valve housing 9 communicate between the medial portion of the transverse passages 21 and 22 and the lubricant reservoir 3, while a downward outlet passage 29 in the valve housing 9 communicates between the lower end of the valve seat 10 and the lubricant reservoir 3.

It is believed clear from the spacing of the lateral outlet passages 23 and 24, the upper outlet passages 27 and 28 and the downward passage 29, that whichever position the oiler is disposed in that at least one of these passages will communicate with whatever lubricant remains in the lubricant reservoir of the oiler.

*Operation.*—In operation, the oiler is first connected in the pressure air line to the percussive tool, the valve 14 adjusted to meter the desired amount of oil into the pressure air by threading the conical head 15 into position relative to the valve seat 11, the lubricant reservoir filled with lubricant, and sealed closed with the plug 18, as is shown in Figure 1 of the drawings.

When the percussive tool is not in operation, pressure air passes through the passages 12 and 13 through the valve seat 11 into the valve chamber or main bore 10, whence it passes through the passages 21, 22 and the outlet passages connected thereto 23, 24, 27 and 28, and through outlet passage 29 into the lubricant reservoir, until the pressure in conduit 4 and the pressure in the lubricant reservoir is equalized.

When the percussive tool (not shown) is placed into operation, pressure air flows through the conduit 4, in constant pulsations, the intermittent exhaust at the percussive tool causing the air pressure in the conduit 4 to fluctuate in the manner well known in the art. On each pressure drop in the pressure air conduit 4, the air in the lubricant reservoir 3 which is at a higher pressure than that in the conduit 4, will escape the from carrying oil in vapor form through the outlet passages, to the valve seat 11 communicating therewith. The air and oil mixture then passes by reason of the differential pressure between the upstream passage 12 and the downstream passage 13 out through the downstream passage 13 to join the flow of pressure air to the percussive tools, the lubricant being deposited in the percussive tools during the course of the pressure air flow therethrough.

On the work stroke, the pressure of the air in the conduit 4 increases once again and will be passed into the lubricant reservoir through the same outlet passages as above described, until the pressure is once again equalized. Since the fluctuating pressure continues when the percussive tool is in operation the pressure reduction continues to occur intermittently and lubricant will be fed into the pressure air as above described for the exhaust stroke of the percussive tool.

Figure 3:
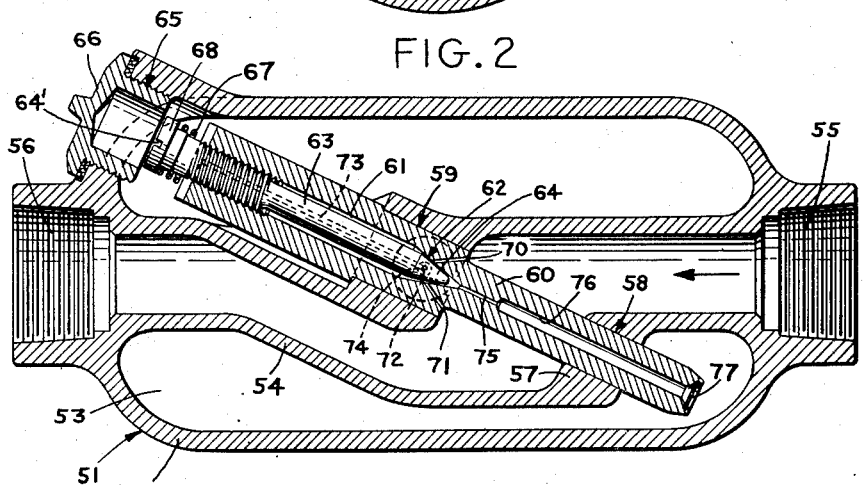
Figure 3 is a vertical section through another form of the invention.

Figure 3, shows another form of the invention, which is adapted to be used when the oiler is placed in a vertical position or in a horizontal position in the pressure air line leading to the percussive tool. In this construction the metering mechanism remains substantially similar but the angular position of the valve housing with respect to the pressure air conduit is modified to accomplish this result.

Thus, the line oiler in this form of the invention generally designated 51 comprises a hollow casing 52 which forms a lubricant reservoir 53 having a pressure air conduit 54 extending diametrically therethrough in the plane of the longitudinal axis thereof. As in the form of the invention shown in Figures 1 and 2, the pressure air conduit 54 has threaded couplings 55 and 56 at the opposite ends thereof continuous therewith for connecting the line oiler 51 into the pressure air line (not shown) for delivering pressure air to the percussive tool of any suitable type.

The conduit 54 has a somewhat S shaped flow path, the medial portion 57 thereof disposed to slope transversely with respect to the inlet and outlet ends which are in substantial alignment with each other. This construction, however, allows the medial portion 57, as in the form of the invention shown in Figures 1 and 2, to receive in bores 58 and 59, a valve housing 60 which although it extends transversely of the flow path through the medial portion 57 of the conduit 4 is so disposed as to be in angled relationship to the longitudinal line of the lubricant reservoir itself, as is clearly shown in Figure 3 of the drawings.

In this position the valve housing 60 lies so that its ends are adjacent the respective ends of the lubricant reservoir 53. In addition, in order to traverse this span the valve housing 60 must be elongated. It is otherwise similar in construction and operation to the form of the metering device and its valve housing above described in the form of the invention shown in Figures 1 and 2.

Thus, the valve housing 60 includes a valve chamber or main bore 61 having a valve seat 62 at its lower end and threaded at its upper end to receive the valve 63 having a conical head 64 adapted to be threaded into adjusted position relative to the valve seat 62 for metering the lubricant therethrough. The valve 63 can be adjusted by a suitable tool (not shown) which is adapted to engage the slot 64' provided at the end of the valve 63 adjacent an opening 65, when the plug 66 is removed therefrom.

The opening 65 serves also as a filling means for the lubricant reservoir, and the plug 66 in addition to acting as a closure means may be backed off to release pressure in the lubricant reservoir when the pressure air is shut off.

A spring 67 is disposed between the valve head 68 and the upper end of the valve housing 60 to hold the conical head 64 in its adjusted position.

Communicating between the valve seat 62 and the pressure conduit 54 are an upstream passage 70 and downstream passage 71. These passages while disposed in the same vertical plane, are disposed one above the other by reason of the angular relation of the valve housing with respect to the longitudinal line of the lubricant reservoir. However, the upstream and downstream passages 70 and 71 as in the form of the invention shown in Figures 1 and 2 open or are disposed at angles to open such that the ends which communicate with the valve seat open on a plane which differs or is spaced from the plane of the ends communicating with the pressure air conduit. In other words, the upstream and downstream passages are angled inwardly toward the valve seat 62.

Similarly, the valve housing 62 is provided with transverse passages, only one passage 72 being illustrated, which passages open on to the valve seat 62 in the same plane as the inner ends of the upstream and downstream passages 70 and 71. These transverse passages, as in the form of the invention shown in Figures 1 and 2 communicate with vertical passages and lateral passages, one vertical passage 73 and one lateral passage 74 being illustrated, as the construction although slightly elongated is otherwise identical with that above described for the valve housing shown in Figures 1 and 2 of the drawings.

A downwardly disposed outlet passage 75 is also provided which communicates between the lower end of the valve seat 62 and the lubricant reservoir 53. The upper or vertical passage 73 and the lateral passage 74 also communicate at their outer ends with the lubricant reservoir.

It is believed clear from the above that the oiler in this form of the invention is particularly adapted to be connected into the pressure air line to the percussive tool in the vertical position. In this position the opening 65 will be disposed at the upper end of the oiler so that the lubricant reservoir 53 can be filled with fluid and the valve reached to make the necessary adjustment between the conical head 64 and the valve seat 62 for metering the lubricant therethrough. However, in any of the vertical positions, at least one of the outlet passages 73, 74 or 75 will be positioned so as to provide communication between the lubricant in the lubricant reservoir and the valve seat 62.

The lower or outer end of the downward passage 75 is indicated as having a counterbore 76 of slightly larger diameter and a screen 77 therein. This construction facilitates the atomization or vaporization of lubricant which is carried through this passage back to the valve seat for passage to the pressure air flowing through the pressure air conduit during operation of the percussive tool as is hereinafter described.

*Operation.*—The operation of the oiler illustrated in Figure 3 of the drawings is identical with that above described for the form of the invention shown in Figures 1 and 2, the angular position of the valve housing 60 merely facilitating placing the oiler in the vertical position. Thus, when pressure air is being fed to the pneumatic tool, but the pneumatic tool is not in operation, pressure air passes through the passages 70 and 71 into the main bore or chamber 61 whence it passes through the transverse passages to the upward passage 73 and lateral passage 74 and through the downward passage 75 into the lubricant reservoir, until the pressure in the lubricant reservoir is equalized with the pressure in air conduit 54.

When the pressure tool is placed into operation pressure air flows through the pressure air conduit 54 in substantially constant pulsations, the intermittent exhaust at the percussive tool causing the air pressure in the conduit 54 to fluctuate in a manner well known in the art. On each exhaust stroke a pressure drop occurs in the air passing through the pressure conduit 54. The air in the lubricant reservoir 53 which is higher than that in the conduit 54 at this time will escape through the respective outlet passages 73, 74 and 75, carrying oil in vapor form therewith to the valve seat 62. The valve seat and conical head 62 and 64 respectively are adjusted to meter the amount of lubricant which passes thereover and by reason of the differential pressure which results from the flow of air about the valve housing 60 the lubricant and air mixture will pass into the pressure air through the downstream passage 71.

On the work stroke, the pressure air in the lubricant reservoir and air conduit 54 will equalize once again.

Figure 4:
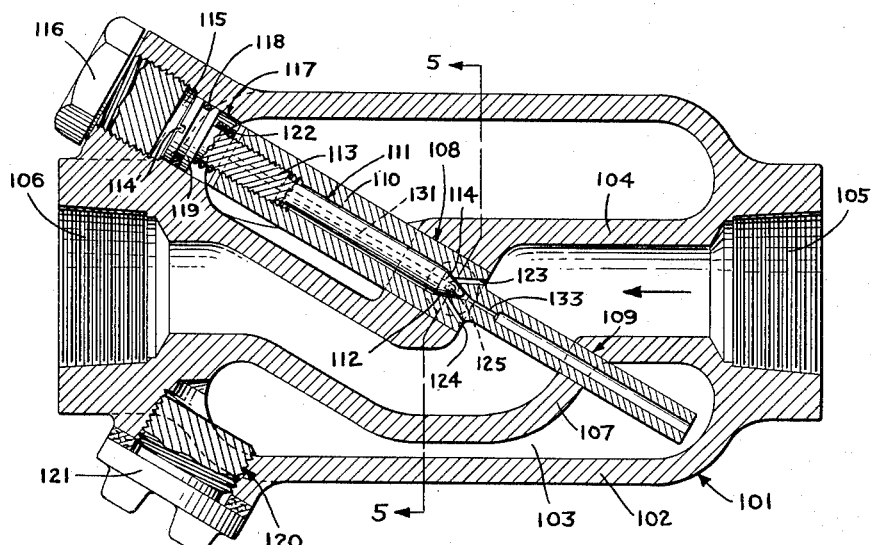
Figure 4 is a vertical section through another form of the invention.
Figure 5:
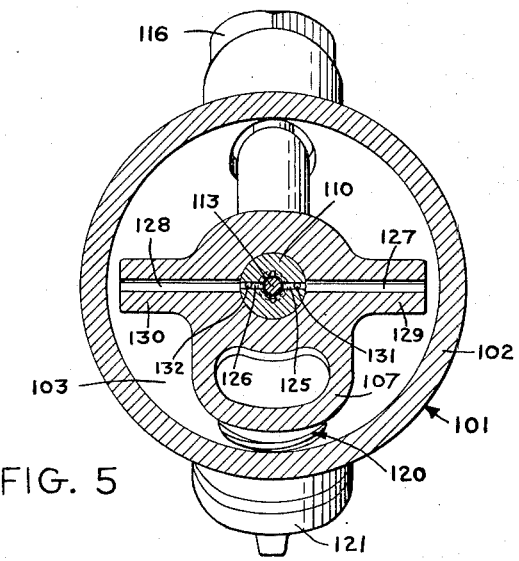
Figure 5 is a section taken on line 5—5 of Fig. 4.

Figure 4 shows another form of the type oiler which is adapted to be placed in either a vertical or horizontal position in a pressure air line leading to the percussive tool, and to be adjusted without shutting off the pressure in the pressure air line to the percussive tool. This same modification while not specifically shown is equally adaptable to the form of the invention shown in Figs. 1 and 2 of the drawings.

This construction is substantially identical with that shown in Fig. 3. Thus, the line oiler in this form of the invention generally designated 101 comprises a hollow casing 102 which forms a lubricant reservoir 103 having a pressure air conduit 104 extending diametrically therethrough in the plane of the longitudinal axis thereof. The pressure air conduit 105 has the usual threaded couplings 105 and 106 at the opposite ends thereof continuous therewith for connecting the line oiler 101 into the pressure air line (not shown) for delivering pressure air to the percussive tool of any suitable type.

The conduit 104 has as in the case of the form of the invention shown in Fig. 3 a somewhat S or zig zag shaped flow path, the medial portion 107 thereof disposed to slope transversely with respect to the inlet and outlet ends which are in substantial alignment with each other. This construction, however, allows the medial portion 107 to receive in the bores 108 and 109, a valve housing 110 which although it extends transversely of the flow path through the medial portion 107 of the conduit 104 is so disposed as to be in angled relationship to the longitudinal line of the lubricant reservoir itself, as is clearly shown in Fig. 4 of the drawings.

In this position as in the case of the form of the invention as shown in Fig. 3, the valve housing 110 lies so that its ends are adjacent the respective ends of the lubricant reservoir 103. In addition, in order to traverse this span the valve housing 110 must be slightly elongated. It is otherwise substantially similar in construction and operation to the form of the metering device and the valve housing above described in the form of the invention shown in Figs. 1 and 3 of the drawings.

Thus, the valve housing 110 includes a valve chamber or main bore 111 having a valve seat 112 at its lower end and threaded at its upper end to receive the valve member 113. The valve member 113 is provided with a conical head 114 adapted to be threaded into adjusted position relative to the valve seat 112 for metering the lubricant from said lubricant reservoir therethrough as is hereinafter described. The valve 113 can be adjusted by a suitable tool (not shown) which is adapted to engage the slot 114' provided at the end of the valve 113 through an opening 115 in the casing 102 when the plug 116 is removed therefrom.

The walls 117 of the lower end of the opening 115 coact with O ring 118 which is mounted on the upper end 119 of the valve 113, which end extends up into the lower end of the opening 115, whereby the O ring and the wall form a seal which prevents leakage of pressure air from said lubricant reservoir, when the plug 116 is removed for the purpose of adjusting the valve 113. In this form of the construction, it is believed clear that the pressure air does not have to be stopped by reason of the above described seal in order to adjust the valve 113 to any new position for more or less oil delivery to the tool. It will be understood that any suitable type packing or sealing means of which there are many easily available on the open market could be utilized in place of the O ring construction shown without departing from the spirit of the present invention.

The lubricant reservoir 103 is filled through an auxiliary opening 120 which is sealed by a plug 121 threadably mounted therein.

As in the above described forms of the invention a spring 122 is interposed between the seat 119 of the valve 113 and the upper end of the valve housing 110 to hold the conical head 114 of the valve in its adjusted position.

Communicating between the valve seat 112 and the pressure conduit 104 are an upstream passage 123 and downstream passage 124. These passages while disposed in the same vertical plane, are disposed one above the other by reason of the angular relation of the valve housing with respect to the longitudinal line of the lubricant reservoir. However, the upstream and downstream passages as in the form of the invention shown as in Fig. 3, open or are disposed at angles to open such that the ends which communicate with the valve seat open on a plane which differs or is spaced from the plane of the ends communicating with the pressure air conduit. In other words, the upstream and downstream passages are angled inwardly toward the valve seat 112.

The remaining structure with respect to the passages is in all ways similar to that shown in the forms of the invention above described except that the passages may be either longer or shorter in actual position. Thus, the usual transverse passages 125 and 126 are provided which communicate on one end with the valve seat 112 and on the other end with lateral outlet passages 127 and 128 disposed in the lateral arms 129 and 130. The lateral arms are illustrated as formed integrally with the pressure air conduit but it is understood that they might be separate elements threadably connected thereto or other means, all of which is clearly shown in Fig. 2 of the drawings.

Figs. 1 and 2 further show that there are vertical passages 131 and 132 which communicate on their inner ends medially along the transverse passages 125 and 126 and on their outer ends with the lubricant reservoir. Similarly a downwardly or outwardly disposed outlet passage 133 communicates between the lower end of the valve seat 112 and the lubricant reservoir.

This type oiler is positioned in the pressure air line to the percussive tool and operated in the same manner as above described for the form of the invention shown in Fig. 2. It differs only in that it is filled through the auxiliary opening 120.

The present construction, however, has the further advantage of the means for adjusting the valve to secure the desired metering of lubricant from the reservoir without the necessity of stopping the flow of the pressure air passing through or leading to the oiler 101.

It is believed within the understanding of a person skilled in this art to adapt the form of the invention shown in Fig. 1 to include the sealing means and auxiliary opening and hence this form of the invention was not illustrated.

It will be understood that the invention is not to be limited to the specific instruction or arrangement of parts shown, but that they may be widely modified with the invention defined by the claims.

What is claimed is:

1. In a line oiler for percussive tools, a casing forming a lubricant reservoir, a pressure air conduit extending through said lubricant reservoir, a valve housing connected in said conduit transversely thereof and provided with a longitudinal bore having a valve seat at one end, an inlet passage and an outlet passage in said housing in the line of pressure air flow in said conduit communicating between said valve seat and said pressure air conduit, a plurality of passages in said housing transversely of said inlet and outlet passages and opening on one end into said valve seat, said transverse passages so disposed that at least one passage will communicate with the lubricant in said reservoir at all times, an adjustable valve to coact with said valve seat to meter the flow of lubricant from said reservoir to the pressure air conduit during operation of said percussive tool, an opening in said casing to adapt said valve to be adjusted during operation, and means in said opening forming a seal to prevent escape of pressure air from said lubricant reservoir when said valve is to be adjusted.

2. In a line oiler for a percussive tool as claimed in claim 1 wherein the valve housing is disposed at an angle to the longitudinal axis of the lubricant reservoir, and the respective ends of said housing are adjacent the ends of lubricant reservoir to allow the lubricant reservoir to be placed vertically in the pressure line.

3. In a line oiler for percussive tools, a casing forming a lubricant reservoir, a pressure air conduit extending through said lubricant reservoir, a valve housing connected in said conduit transversely of the longitudinal line thereof, a bore forming a valve chamber in said valve housing having a valve seat at one end, an inlet opening and an outlet opening disposed on opposite sides of said valve housing, said inlet opening and outlet opening opening at one end on said valve seat and communicating at their respective other ends with said pressure air conduit upstream and downstream of said valve housing, spaced passages in said housing disposed transversely of said inlet and outlet openings and opening on said valve seat, lateral outlet passages communicating with the ends of said spaced passages remote from the valve seat end, outlet passages in said valve housing communicating between the medial portion of said spaced passages and said lubricant reservoir, and an outlet passage disposed in the opposite direction from said second mentioned outlet passages communicating between the lower end of said valve seat and said lubricant reservoir, said lateral passages and outlet passages so disposed that at least one of said passages communicates with the lubricant in said lubricant reservoir at all times, and an adjustable means to coact with said valve seat to meter the flow of lubricant from said reservoir to the pressure air conduit during operation of said percussive tool.

References Cited in the file of this patent

UNITED STATES PATENTS

| | | |
|---|---|---|
| 1,763,683 | Bayles | June 17, 1930 |
| 1,782,741 | Norgren | Nov. 25, 1930 |
| 1,804,186 | Terry | May 5, 1931 |
| 1,896,368 | Pearson | Feb. 7, 1933 |
| 2,512,366 | Nast | June 20, 1950 |
| 2,571,098 | Arnold | Oct. 16, 1951 |